United States Patent [19]

Beck

[11] E Re. 30,486

[45] Reissued Jan. 20, 1981

[54] NOZZLE ASSEMBLIES FOR ATOMIZING AND MIXING DIFFERENT FLUIDS AND COMBINING THE MIXTURE WITH SOLIDS AND THE LIKE

[76] Inventor: Louis Beck, 6399 Crossview Rd., Seven Hills, Ohio 44131

[21] Appl. No.: 844,515

[22] Filed: Oct. 25, 1977

Related U.S. Patent Documents

Reissue of:

[64] Patent No.: 3,986,673
Issued: Oct. 19, 1976
Appl. No.: 610,656
Filed: Sep. 5, 1975

[51] Int. Cl.[2] ..... B05B 7/00

[52] U.S. Cl. ..... 239/423; 239/544

[58] Field of Search ..... 239/423, 544, 306, 314, 239/417.5, 424.5, 426, 433, 543, 544, 418, 422, 599, 600

[56] References Cited

U.S. PATENT DOCUMENTS

| | | | |
|---|---|---|---|
| 590,526 | 9/1897 | Jarre et al. | 239/543 |
| 1,494,020 | 5/1924 | Riehm | 239/543 X |
| 1,702,339 | 2/1929 | Fukuhara | 239/543 |
| 3,000,576 | 9/1961 | Levey et al. | 239/499 |
| 3,033,472 | 5/1962 | Shelton | 239/422 X |
| 3,236,457 | 2/1966 | Kennedy et al. | 239/414 X |
| 3,730,437 | 5/1973 | Rousselot | 239/544 |

*Primary Examiner*—John J. Love
*Attorney, Agent, or Firm*—Pearne, Gordon, Sessions

[57] ABSTRACT

Nozzle assemblies are provided which are effective for atomizing and mixing different or unlike fluids, and for combining the mixtures with solids and the like. The nozzle assemblies project the fluids, in the form of sprays or jets, which combine or mix at points or areas spaced forwardly of the nozzles, whereby clogging of the nozzles is avoided, and the separate fluids are prevented from contaminating each other within the nozzles or other parts of the assemblies. Nozzles of special or unique design are provided, which have an improved atomizing action.

27 Claims, 12 Drawing Figures

NOZZLE ASSEMBLIES FOR ATOMIZING AND MIXING DIFFERENT FLUIDS AND COMBINING THE MIXTURE WITH SOLIDS AND THE LIKE

Matter enclosed in heavy brackets [ ] appears in the original patent but forms no part of this reissue specification; matter printed in italics indicates the additions made by reissue.

This invention relates, as indicated, to nozzle assemblies for atomizing and mixing different fluids, and for combining such mixtures with solids and the like.

A primary object of the invention is to provide a nozzle assembly of the character described, which is effective to cause the sprays or jets of atomized fluid to converge and mix at points spaced from the points at which atomization occurs, whereby backlash of the sprays or jets is inhibited, and contamination of the nozzle or nozzle assembly thereby avoided.

Another object of the invention is to provide a nozzle assembly of the character described, through the use of which several colors of paint may be sprayed to produce special effects, such as speckled or spattered finishes.

A further object of the invention is to provide a nozzle assembly of the character described, through the use of which a steady stream of a particular type of fluid may be introduced to converge with the point or area of convergence of the other fluids, and thereby assist in the mixing of the other fluids.

A further object of the invention is to provide a nozzle assembly of the character described, through the use of which solids, such as fibers and powders, and the like, may be introduced into the mixture formed by the converging sprays or jets of atomized fluids.

A still further object of the invention is to provide methods of mixing different fluids and for the combining such mixtures with solids and the like.

Other objects and advantages of my invention will be apparent during the course of the following description.

In the accompanying drawings forming a part of this specification, and in which like numerals are employed to designate like parts throughout the same, FIG. 1 is a top plan view, on an enlarged scale, of a form of nozzle assembly, embodying the invention;

Figures 1, 2, 3, 4:
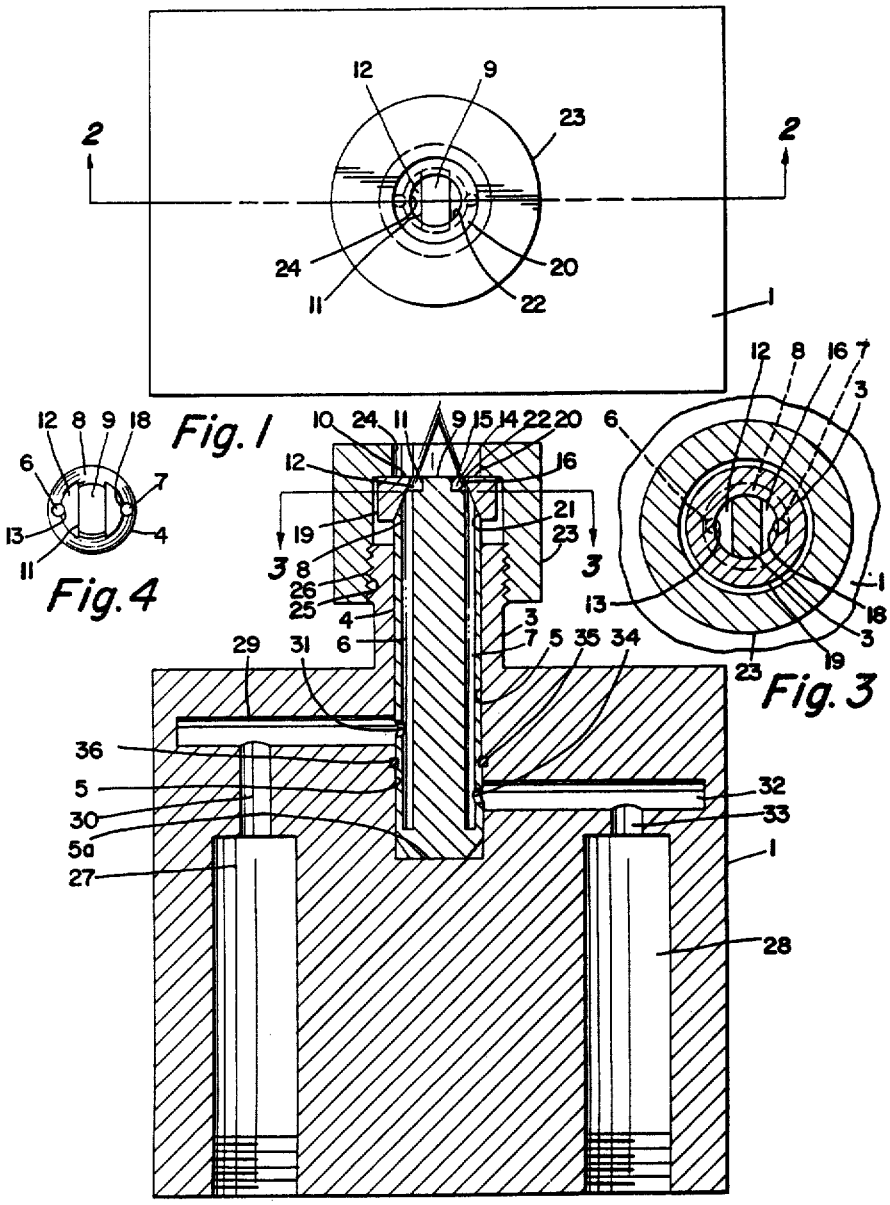
FIG. 2 is a cross-sectional view, taken on the line 2—2 of FIG. 1.
FIG. 3 is a fragmentary cross-sectional view, taken on the line 3—3 of FIG. 2.
FIG. 4 is a top plan view of the nozzle stem of FIGS. 1, 2 and 3.

Referring more particularly to FIGS. 1 to 4 inclusive of the drawings, a nozzle assembly is shown, comprising a body of base 1, which is adapted for connection to a spray gun or the like.

The body or base 1 has a cylindrical extension 3 which is designed to receive the stem 4 of a nozzle, which stem rests on the bottom 5a of a recess 5 in the base 1, this recess being of a diameter equivalent to the diameter of the inner wall of the extension 3.

The stem 4 is drilled or bored to provide parallel passageways 6 and 7 spaced equidistantly from the axis of the stem.

The stem 4 is also provided at its upper end with a conical surface 8 which terminates at its upper end in a flat surface 9 of relatively small diameter as compared with the lower portion of the stem, the surface 9 lying in a plane which is perpendicular to the axis of the stem.

The passageways 6 and 7 extend from the lower end of the stem 4 to the conical surface 8.

A portion of the upper end of the stem 4, adjacent the passageway 6, is milled or otherwise cut away to provide a space 10 which is defined by a vertical wall 11 and a horizontal ledge 12. The passageway 16 extends through the outer edge of the ledge 12, as at 13 (FIG. 4).

A portion of the upper end of the stem 4 adjacent the passageway 7 is similarly milled or otherwise cut away to provide a space 14 which is defined by a vertical wall 15, parallel with the wall 11, and a ledge 16, which is coplanar with the ledge 12. The passageway 7 extends through the outer edge of the ledge 16, as at 18 (FIG. 4).

The function of the spaces 10 and 14 will be presently explained.

The nozzle assembly further includes a disc-like cap or head 19 having an annular flat upper surface 20 and a conical lower surface 21 of the same conicity as the conical surface 8 of the stem 4. The surface 21 is adapted for seating on the surface 8, and when thus seated, the surface 20 is coplanar with the surface 9 of the stem.

The intersection of the surfaces 20 and 21 provide a central circular opening 22 in the cap or head 19, which opening is coplanar with the flat upper surface 9 of the stem.

For the purpose of retaining the cap or head 19 seated on the conical surface 8 of the stem 4, a retainer ring or collar 23 is provided having a central opening 24, this ring or collar being internally threaded, as at 25, for threaded securement to external threads 26 of the extension 3 of the body or base 1.

The nozzle body or base 1 is provided with an inlet passageway 27 for entry into the base, of a fluid, such, for example, as an epoxy resin, and with a second inlet passageway 28 for entry into the base, of a second fluid, such, for example, as a catalyst, which is normally used in conjunction or combination with the epoxy resin, to form an epoxy glue.

The passageway 27 communicates with a passageway 29, through a passageway 30, which contains a one-way valve (not shown). The passageway 29 communicates with a port 31 which extends from the exterior of the stem 4 to the passageway 6.

The passageway 28 communicates with a passageway 32, through passageway 33, which contains a one-way valve (not shown). The passageway 32 communicates with a port 34, which extends from the exterior of the stem 4 to the passageway 7, at a level lower than that at which the passageway 29 communicates with the port 31.

In order to prevent fluid which enters the port 31 from leaking to the port 34, the stem 4 is provided with an annular recess 35, at a level between the ports 31 and 34, in which recess an O-ring 36 is disposed, which bears resiliently against the outer wall of the recess 5.

The nozzle assembly which has been described is adapted, as previously stated, for connection to a spray gun, which provides fluids, under pressure from a receptacle or pump, and which forces the pressurized fluids upwardly through the passageways 6 and 7.

The fluid which passes through the passageway 6 enters the space 10 through the opening 13. This fluid, as it enters the space 10, is deflected by the conical surface 21 of the cap or head 19, and projected, in the form of an atomized spray or jet, through the opening 22 in the cap 19 and the opening 24 in the ring or collar 23, to a point spaced from the surface 9 of the stem 4, as indicated in FIG. 2.

At the same time, the fluid which passes through the passageway 7 enters the space 14 through the opening 18. This fluid, as it enters the space 14, is deflected by the conical surface 21 of the cap or head 19, and projected, in the form of an atomized spray or jet, through the opening 22 in the cap 19 and the opening 24 in the ring or collar 23, to the same point forwardly of the surface 9 of the stem 4, as the first fluid, as indicated in FIG. 2.

By thus causing the sprays or jets to converge and mix at a point spaced from the points at which atomization of the fluids occur, backlash of the sprays or jets is avoided, to thereby prevent contamination of the nozzle or other portions of the spray gun.

The nozzle assembly, as thus described, is adapted for spraying a combination of fluids, to provide special or unique effects, such as speckled or spattered finishes or coatings.

Figures 5, 6, 7, 8, 9, 10:
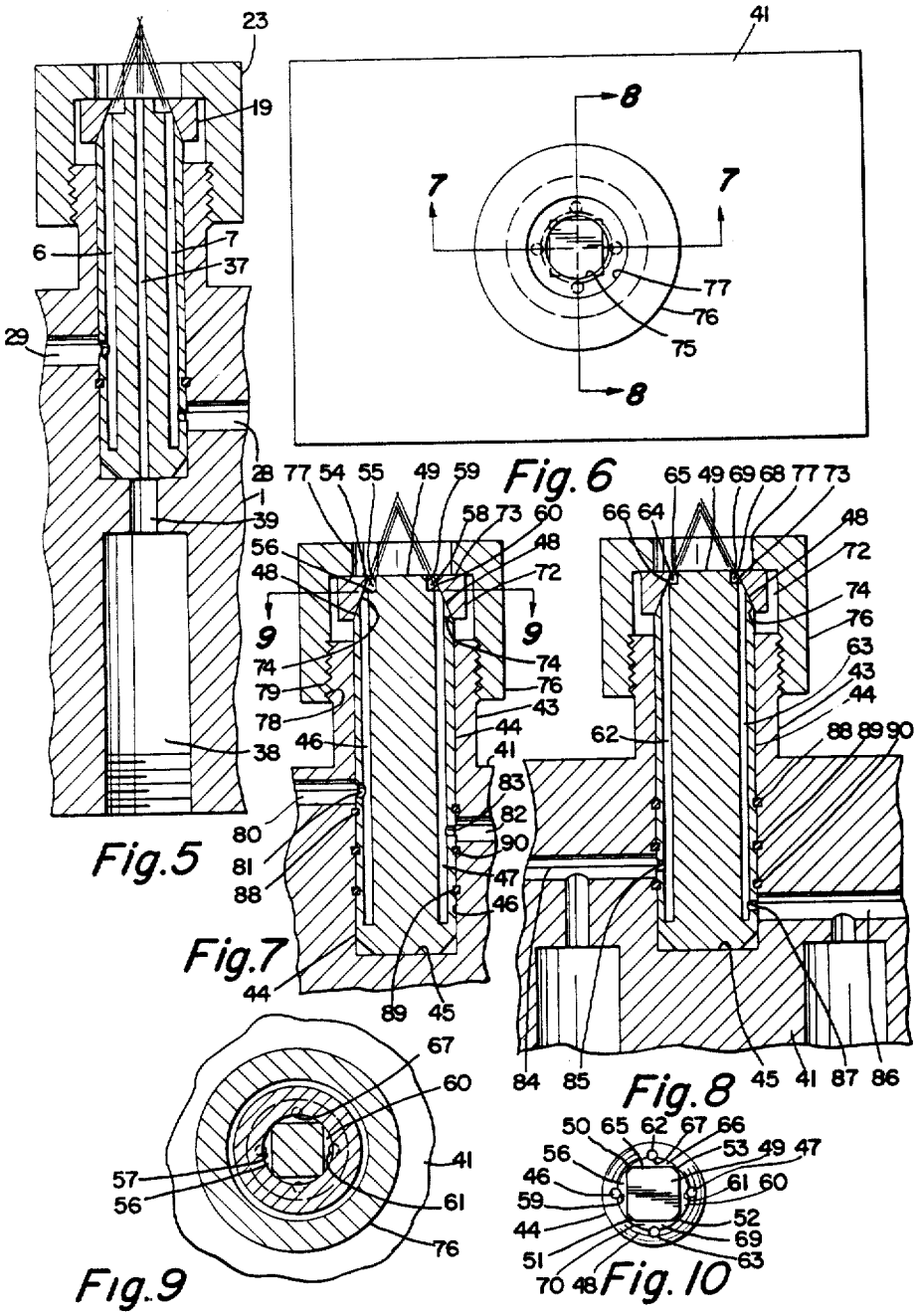
FIG. 5 is a fragmentary cross-sectional view, similar to FIG. 2, but of a modified form of nozzle assembly.
FIG. 6 is a view similar to FIG. 1, but of another modification.
FIG. 7 is a fragmentary cross-sectional view, taken on the line 7—7 of FIG. 6.
FIG. 8 is a fragmentary cross-sectional view, taken on the line 8—8 of FIG. 6.
FIG. 9 is a fragmentary cross-sectional view, taken on the line 9—9 of FIG. 7.
FIG. 10 is a top plan view of the nozzle stem of FIGS. 6, 7, 8 and 9.

In FIG. 5, a modification of the assembly is shown which is similar in all rspects to that shown in FIGS. 1 to 4, but in which a central or axial hole or passageway 37 is provided in the stem 4, into which a spatter fluid, as, for example, of a type which contains solvents and resins not compatible with the other two sprays, may be introduced, and projected to the point of convergence of the other two sprays to mix with such fluids. The spatter fluid will float and be exposed above the painted background. The axial hole or passageway 37 could also be employed for introducing solid materials, such as a reflective ground glass powder, when spraying catalyzed road stripe paint; or could be employed for introducing fibres for the purpose of reinforcing rubber paint or a polyester. The passageway 37 is supplied with a fluid through passageways 38 and 39 in the base 1.

If desired, or necessary, the diameter of the center hole or passageway 37 could be enlarged to permit air driven fibers or powders to be introduced into the sprays at their point or area of convergence of mixing.

In FIGS. 6 to 10 inclusive, another modification is shown, in which a body or base 41 is provided, having a cylindrical extension 43, which is designed to receive the stem 44, which rests on the bottom 45 of a recess 46 in the base 41, this recess being of a diameter equivalent to the diameter of the inner wall of the extension 43.

The stem 44 is drilled or bored to provide parallel passageways 46 and 47 spaced equidistantly from the axis of the stem.

The stem 44 is also provided at its upper end with a conical surface 48, which terminates at its upper end with a flat surface 49 of substantially square contour, it being noted, however, that the conical surface 48 extends to the surface 49 at the corners 50, 51, 52 and 53 of the surface 49 (see FIG. 10), for a purpose to be presently explained. The surface 48 lies in a plane which is perpendicular to the axis of the stem 44.

The passageways 46 and 47 extend from the lower end of the stem 44 to the conical surface 48.

A portion of the upper end of the stem 44 is milled or otherwise cut away to provide a space 54 which is defined by a vertical wall 55 and a horizontal ledge 56. The passageway 46 extends through the outer edge of the ledge 56, as at 57 (FIGS. 9 and 10).

A portion of the upper end of the stem 44 adjacent the passageway 47 is similarly milled or otherwise cut away to provide a space 58 which is defined by a vertical wall 59, parallel with the wall 55, and a ledge 60 which is coplanar with the ledge 56. The passageway 47 extends through the outer edge of the ledge 60, as at 61.

The function of the spaces 54 and 58 will be presently explained.

The stem 44 is also drilled or bored to provide parallel passageways 62 and 63 spaced equidistantly from the axis of the stem, but disposed circumferentially 90° from the passageways 46 and 47 (see FIG. 10). The passageways 62 and 63 extend from the lower end of the stem 44 to the conical surface 48.

The portion of the upper end of the stem 44 adjacent the passageway 62 is milled or otherwise cut away to provide a space 64 which is defined by a vertical wall 65 (FIG. 8) and a horizontal ledge 66. The passageway 62 extends through the outer edge of the ledge 66, as at 67 (FIGS. 9 and 10).

A portion of the upper end of the stem 44 adjacent the passageway 63 is similarly milled or otherwise cut away to provide a space 68 which is defined by a vertical wall 69, parallel with the wall 65, and a horizontal ledge 70, which is coplanar with the ledges 56, 60 and 66. The passageway 63 extends through the outer edge of the ledge 70, as at 71.

The function of the spaces 64 and 68 will be presently explained.

The nozzle assembly further includes a disc-like cap or head 72 having an annular flat upper surface 73 and a conical lower surface 74 of the same conicity as the conical surface 48 of the stem 44. The surface 74 is adapted for seating on the surface 48, and when thus seated, the surface 73 is coplanar with the surface 49 of the stem.

The intersection of the surfaces 73 and 74 provide a central circular opening 75 in the cap or head 72 which opening is coplanar with the flat upper surface 49 of the stem.

For the purpose of retaining the cap or head 72 seated on the conical surface 48 of the stem 44, a retainer ring or collar 76 is provided having a central opening 77, this ring or collar being internally thread, as at 78, for threaded securement to external threads 79 of the extension 49 of the body or base 41.

The nozzle body or base 41 is provided with an inlet passageway 80 for entry of a fluid into the passageway 46 through a port 81, and with an inlet passageway 82 for entry of a fluid into the passageway 47 through a port 83.

The body or base 41 is also provided with an inlet passageway 84 for entry of a fluid into passageway 62 through a port 85, and with an inlet passageway 86, for entry of a fluid into passageway 63 through a port 87.

The passageways 80 and 82 are sealed from communication with each other by means of an O-ring 88, while the passageways 84 and 86 are sealed from communication with each other by an O-ring 89, and the passageways 82 and 84 are sealed from communication with each other by an O-ring 90.

The nozzle assembly of FIGS. 6–10 is adapted for connection to a spray gun which provides fluids under pressure from receptacles or pump, and which forces the pressurized fluids upwardly through the passageways 46, 47, 62 and 63.

These fluids enter the spaces, 54, 58, 64 and 68 through the openings 57, 61, 67 and 71, are deflected by the conical surface 74 of the cap or head 72, and projected in the form of atomized sprays or jets through the opening 75 in the cap or head 72, and the opening 77 in the ring or collar 76, to a point spaced from the surface 49 of the stem 44, as indicated in FIGS. 7 and 8.

By thus causing the sprays or jets to converge and mix at a point or area spaced from the points at which atomization of the fluids occur, backlash of the sprays or jets is avoided, and contamination of the nozzle or other portions of the spray gun inhibited.

Due to the fact that the conical surface 48 extends to the surface 49 at the corners 50, 51, 52 and 53, there can be no communication or transfer of fluids between the spaces 54, 58, 64 and 68, and assurance is thus had that the sprays or jets are not intermixed or combined before they reach a common point or area spaced forwardly of the surface 49 of the stem 44.

Figure 11:
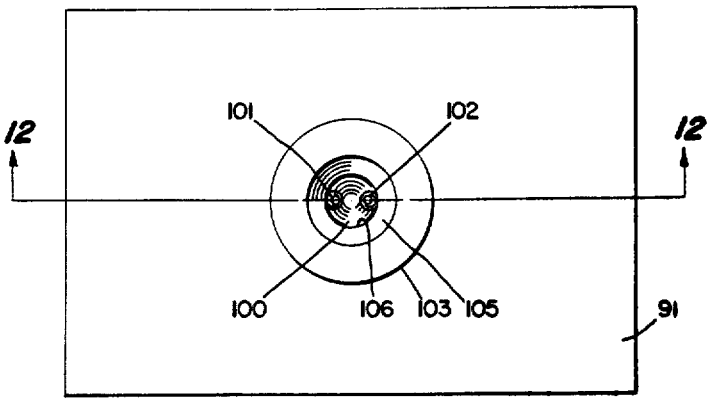
FIG. 11 is a view similar to FIG. 6, but of still another modification of the invention.
Figure 12:
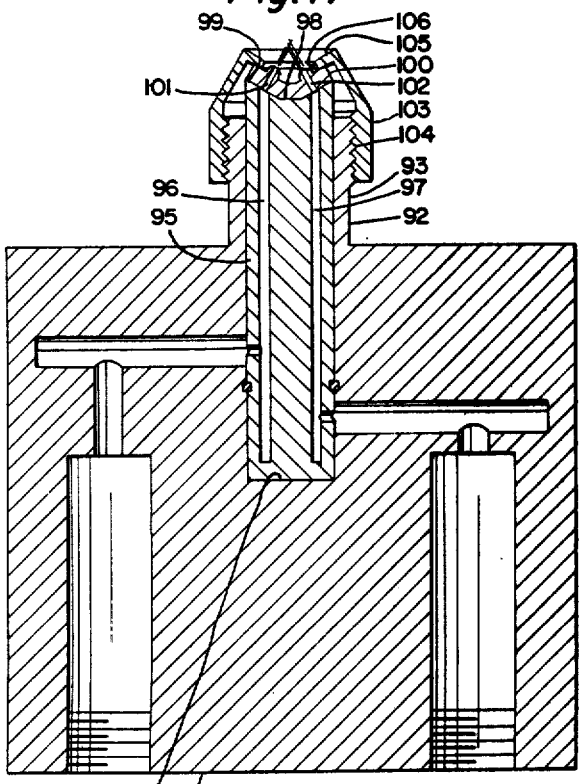
FIG. 12 is a cross-sectional view, taken on the line 12—12 of FIG. 11.

In that form of the invention shown in FIGS. 11 and 12, the nozzle assembly comprises a body or base 91, having a cylindrical extension 92 which is designed to receive the stem 93, which rests on the bottom 94 of a recess 95 in the base 91.

The stem 93, in this instance, is drilled or bored to provide parallel passageways 96 and 97, spaced equidistantly from the axis of the stem.

The stem 93 terminates at its upper end in a seat comprising a flat circular central portion 98, and a conical portion 99, which extends from the periphery of the portion 98 to the external surface of the stem.

The passageways 96 and 97 extend to the conical portion 99 of the seat.

The seat as thus described has seated thereon a cap or head 100, the lower surface of which is contoured to snugly engage the seat, and is provided with ports 101 and 102, which extend through the cap or head 100, and communicate respectively with the upper ends of the passageways 96 and 97.

The ports 101 and 102 are angulated to provide for passage therethrough of sprays or jets of different fluids, which, under pressure, are so directed as to meet and mix with each other at a common point or area spaced forwardly from the cap or head 100, as indicated in FIG. 12.

For the purpose of retaining the cap or head 100 in properly seated position, a ring or collar 103 is provided, which is threadedly secured to threads 104 of the extension 92, and has an inwardly and downwardly directed annular flange 105 which engages the peripheral portion of the cap or head. The cap or head has a central opening 106, through which the sprays or jets emerging from the ports 101 and 102 are projected.

This form of the invention provides a somewhat different manner for uniting or mxing unlike fluids at a sufficient distance from the orifices or ports 101 and 102 to prevent clogging of the ports and contamination of the nozzle.

The cap or head 102 may be molded from a sintered powdered metal, and the size of the ports or orifices, as well as their angularity determined or varied to produce any desired effect.

In this form of the invention, moreover, nozzle assemblies of very small size can be made.

The nozzle assemblies, as thus described, can be used for a variety of purposes, as, for example, mixing resins, such a rubber, with Dacron fibers, mixing polyesters with fibreglass or other strong fibers, mixing two or more component materials each of which depends on the other or others to form polymerized compounds, and for the purpose of incorporating beads in road striping paints or paint mixtures.

It is thus seen that I have provided nozzles or nozzle assemblies which are well adapted for atomizing and mixing different or unlike fluids, and for combining such mixtures with solids and the like.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention, I claim:

1. In a nozzle assembly of the character described, a body having passageways for flow of separate fluids therethrough, a nozzle or stem mounted in said body and having parallel passageways communicating with said first-named passageways, said stem having a conical surface at its upper end, said second-named passageways terminating at said conical surface, said stem having spaces offset inwardly from said terminal ends of said second-named passageways, but in communication with said terminal ends, and a cap mounted on said stem and having a conical lower surface seated on said first-named conical surface, and effective to cause fluids emerging from said second-named passageways to be diverted into said spaces.

2. A nozzle assembly, as defined in claim 1, including means secured to said body for maintaining said cap in said seated position.

3. A nozzle assembly, as defined in claim 2, wherein said stem is milled at its upper end to provide a plurality of said spaces, which are non-communicating with each other, and said cap is effective to prevent such communication.

4. In a nozzle assembly of the character described, a nozzle stem having passageways for flow of separate fluids therethrough, said stem having a conical surface at its upper end, said passageways terminating at said conical surface, said stem having spaces offset inwardly from said terminal ends of said passageways, but in communication with said terminal ends, and a cap mounted on said stem and having a conical lower surface seated on said first-named conical surface, and effective to cause fluids emerging from said terminal ends of said passageways to be diverted into said spaces.

5. A nozzle assembly, as defined in claim 4, including means for securing said cap in seated position on said stem.

6. A nozzle assembly, as defined in claim 5, wherein said stem is milled at its upper end to provide a plurality of said spaces, which are non-communicating with each other, and said cap is effective to prevent such communication.

*7. In a nozzle assembly of the character described, a body having passageways for flow of fluids therethrough, a nozzle or stem mounted in said body and having passageways communicating with said first-named passageways, said stem having a conical surface at its upper end, said second-named passageways terminating at said conical surface, said stem having spaces offset inwardly from said terminal ends of said second-named passageways, but in communication with said terminal ends, and a cap mounted on said stem and having a conical lower surface seated on said first-named conical surface, and effective to cause fluids emerging from said second-named passageways to be diverted into said spaces.*

*8. A nozzle assembly as defined in claim 7, including means secured to said body for maintaining said cap in said seated position.*

*9. A nozzle assembly, as defined in claim 8, wherein said stem is milled at its upper end to provide a plurality of said spaces, which are non-communicating with each other and said cap is effective to prevent such communication.*

*10. In a nozzle assembly for use in connection with a paint spray gun, a nozzle stem having a passageways for flow of fluids therethrough, said stem having a conical surface at its upper end, said passageways terminating at said conical surface, said stem having spaces offset inwardly from said terminal ends of said passageways but in communication with said terminal ends, and a cap mounted on said stem and having a conical lower surface seated on said first-named conical surface, and effective to cause fluids emerging from said terminal ends of said passageways to be diverted into said spaces.*

*11. A nozzle assembly, as defined in claim 10, including means for securing said cap in seated position on said stem.*

*12. A nozzle assembly, as defined in claim 11, wherein said stem is milled at its upper end to provide a plurality of said spaces, which are non-communicating with each other, and said cap is effective to prevent such communication.*

*13. An airless spray painting nozzle for atomizing a liquid paint comprising a stem having a longitudinal axis, a frustoconical surface at one end of said stem, said frustoconical surface having a conical surface extending longitudinally to and terminating at a lateral end face, separated spaces extending laterally into said stem from said conical surface toward said longitudinal axis and extending longitudinally into said stem from said lateral end face, liquid paint passages extending longitudinally through said stem and terminating at said spaces, a cap having a matching conical lower surface seated on said conical surface of said stem, said conical lower surface being longitudinally aligned with the locations at which said passages terminates at said spaces so that liqud paint discharged from said passages impinges upon said conical lower surface.*

*14. An airless spray painting nozzle as set forth in claim 13, said passages terminating at the juncture of said stem conical surface and said lower conical surface.*

*15. An airless spray painting nozzle as set forth in claim 13, wherein said conical surfaces cooperating to maintain said spaces in non-communicating relation with one another.*

*16. An airless spray painting nozzle for atomizing a liquid paint comprising a stem having a longitudinal axis, a conical surface at one end of said stem, a cap having a matching conical lower surface seated on said conical surface of said stem, cylindrical liquid paint passages extending longitudinally through said stem and terminating at locations at the juncture of said conical surfaces, said cap and said stem including laterally extending spaces at said locations, said passages terminating at an elliptical openings defined by said cylindrical passages and by said conical lower surface.*

*17. An airless spray painting nozzle for atomizing a liquid paint comprising a stem having a longitudinal axis and a longitudinally facing end surface, liquid flow passages for carrying said liquid paint substantially in the absence of air or other gas, said passages extending longitudinally through said stem and terminating at a passage openings at said end surface, an inclined wall longitudinally aligned with each of said passage openings, said inclined wall extending in a direction longitudinally away from each of said passage openings and laterally toward said longitudinal axis, said inclined wall being constructed and arranged so that said liquid paint discharged from each of said passage openings impinges upon said inclined wall, said inclined wall terminating at a first laterally extending edge spaced longitudinally and laterally away from each of said passage openings, said first laterally extending edge facing in a direction toward said longitudinal axis, and a second laterally extending edge spaced longitudinally and laterally away from each of said passage openings, said second laterally extending edge facing in a direction away from said longitudinal axis, and said laterally extending edges each being disposed in a plane which is perpendicular to said longitudinal axis.*

*18. An airless spray painting nozzle as set forth in claim 17, including a three-dimensional space between each of said passage openings and said first and second edges.*

*19. An airless spray painting nozzle as set forth in claim 18, said first and second edges being coplanar and intersecting to cooperatively define an end opening associated with each of said passage openings, and each of said end openings being spaced longitudinally from said associated passage opening, and said three-dimensional spaces being between said passage openings and said end openings.*

*20. An airless spray painting nozzle as set forth in claim 17, wherein said end surface is conical.*

*21. An airless spray painting nozzle as set forth in claim 17, wherein said inclined surface is conical.*

*22. An airless spray painting nozzle as set forth in claim 17, wherein said first laterally extending edge is semicircular.*

*23. An airless spray painting nozzle as set forth in claim 17, wherein said second laterally extending edge is straight.*

*24. An airless spray painting nozzle for atomizing a liquid paint comprising a stem having a longitudinal axis and a longitudinally facing end surface, liquid flow passages for carrying said liquid paint substantially in the absence of air or other gas, said passages extending longitudinally through said stem and terminating at passage openings at said end surface, an inclined wall longitudinally aligned with each of said passage openings, said inclined wall extending in a direction longitudinally away from said passage openings and laterally toward said longitudinal axis, said inclined wall being constructed and arranged so that liquid paint discharged from said passage openings impinges upon said inclined wall, a laterally extending edge spaced longitudinally and laterally away from each of said passage openings, said edge facing said inclined wall, said inclined wall at least partially defining three-dimensional spaces associated with said passage openings, and said three-dimensional spaces being disposed between said associated passage openings and said edge.*

*25. An airless spray painting nozzle as set forth in claim 24, said laterally extending edge at least partially defining end openings associated with said passage openings, and*

*said end openings being spaced longitudinally from said passage openings, and said three-dimensional spaces being between said passage openings and said end opening.*

*26. An airless spray painting nozzle as set forth in claim 24, said end surface and said inclined wall each being conical.*

*27. An airless spray painting nozzle assembly comprising a stem and a cap, said stem having a conical surface, liquid flow passages extending through said stem and terminating at spaced locations at said conical surface, said cap having a matching conical surface seated on said conical surface of said stem, said conical surface and said matching conical surface cooperatively defining elliptical nozzle openings, said stem including a radial wall intersecting said conical surface of said stem, said passages intersecting said radial wall, and said nozzle openings being at intersections of said passages and said radial wall.*

* * * * *